(12) United States Patent
Leu et al.

(10) Patent No.: US 8,674,011 B2
(45) Date of Patent: Mar. 18, 2014

(54) ORGANIC/INORGANIC HYBRID MATERIAL AND FABRICATION METHOD THEREOF

(75) Inventors: Chyi-Ming Leu, Hsinchu County (TW); Tzong-Ming Lee, Hsinchu (TW); Chih-Jen Yang, Zhongli (TW)

(73) Assignee: Industrial Technology Research Institute, Hsinchu County (TW)

( * ) Notice: Subject to any disclaimer, the term of this patent is extended or adjusted under 35 U.S.C. 154(b) by 319 days.

(21) Appl. No.: 12/954,838

(22) Filed: Nov. 26, 2010

(65) Prior Publication Data

US 2011/0130507 A1    Jun. 2, 2011

(30) Foreign Application Priority Data

Nov. 27, 2009 (TW) ............................... 98140516 A
Nov. 26, 2010 (TW) ............................... 99140935 A

(51) Int. Cl.
*C08K 3/34* (2006.01)

(52) U.S. Cl.
USPC .......................... 524/445; 523/333; 524/449

(58) Field of Classification Search
USPC .......................................... 524/445; 523/333
See application file for complete search history.

(56) References Cited

U.S. PATENT DOCUMENTS

| | | | |
|---|---|---|---|
| 5,102,948 A | 4/1992 | Deguchi et al. | |
| 5,206,284 A | 4/1993 | Fukui et al. | |
| 5,248,720 A | 9/1993 | Deguchi et al. | |
| 5,414,042 A | 5/1995 | Yasue et al. | |
| 5,527,871 A * | 6/1996 | Tani et al. | 528/10 |
| 5,665,368 A * | 9/1997 | Lentini et al. | 424/401 |
| 6,225,394 B1 | 5/2001 | Lan et al. | |
| 6,710,104 B2 * | 3/2004 | Haraguchi | 523/205 |
| 2007/0299189 A1 | 12/2007 | Cao et al. | |
| 2008/0004391 A1 | 1/2008 | Chan et al. | |

FOREIGN PATENT DOCUMENTS

| | | |
|---|---|---|
| CN | 1400228 A | 3/2003 |
| CN | 101027354 A | 8/2007 |
| CN | 101080445 A | 11/2007 |
| JP | 09-221316 A | 8/1997 |
| TW | 200801095 A | 1/2008 |
| TW | 200902613 A | 1/2009 |
| WO | WO 9304118 A1 * | 3/1993 |

* cited by examiner

*Primary Examiner* — Vickey Nerangis
(74) *Attorney, Agent, or Firm* — Pai Patent & Trademark Law Firm; Chao-Chang David Pai

(57) ABSTRACT

An organic/inorganic hybrid material is provided, including an organic polymer, and a plurality of inorganic nano-platelets, wherein the inorganic nano-platelets are self-connected or connected via a linker to constitute an inorganic platelet network. By the formation of the inorganic network structure, the hybrid materials can keep their transparency and flexibility at a high inorganic content, and exhibit greatly reduced coefficients of thermal expansion A method for fabricating the organic/inorganic hybrid material is also provided.

20 Claims, 3 Drawing Sheets

ORGANIC/INORGANIC HYBRID MATERIAL AND FABRICATION METHOD THEREOF

CROSS REFERENCE TO RELATED APPILCATIONS

This application claims priority of Taiwan Patent Application No. 098140516, filed on Nov. 27, 2009 and Taiwan Patent Application No. 99140935 filed on Nov. 26, 2010, the entirety of which is incorporated by reference herein. The subject matter of this application relates to that of copending application Ser. No. 12/954,834 filed Nov. 26, 2010 for "Organic/inorganic hybrid material and fabrication method thereof". The disclosure of the copending application is incorporated herein by reference in their entirety.

BACKGROUND OF THE INVENTION

1. Field of the Invention

The present invention relates to an organic/inorganic hybrid material, and in particular relates to an organic/inorganic hybrid material having an inorganic platelet network structure.

2. Description of the Related Art

Organic/inorganic hybrid materials consisting of a combination of an inorganic material and an organic phase combine the properties of organic and inorganic materials. Inorganic materials such as glass, fiber, clay, and carbon black are typically added to an organic polymer as a filler or as a reinforcing agent to improve physical properties and reduce production cost. The effectiveness of an inorganic filler is generally determined by the degree of dispersion of the inorganic filler in the polymer matrix. By conventional mechanical blending, only a micro-scale dispersion of the inorganic filler can be achieved and improvement in physical properties is limited. Using a novel organic/inorganic nano-hybrid technique, an inorganic filler can be dispersed in an organic matrix at a nano-scale, greatly improving physical properties due to the greater contact surface between the organic phase and inorganic phase. A nano-hybrid material is characterized by high transparency, high thermal resistance, low coefficient of thermal expansion, and excellent mechanical properties. In order to increase the physical properties, the key issue in developing hybrid materials is to increase the amount of inorganic filler present in the hybrid.

A typical example of nanoclay/polymer material is clay/nylon nanocomposite as disclosed in U.S. Pat. Nos. 5,102, 948, 5,206,284, 5,248,720, and 5414042. In one approach, smectite clay is modified to an organoclay by ion exchange with quaternary ammonium compounds to improve dispersibility in an organic solvent. The organoclay is then mixed with a polymer material in the organic solvent to provide a composite. The composite thus prepared has an inorganic content of up to 20 wt %. In another approach, the clay is intercalated with a water soluble polymer to improve dispersibility, and then dispersed in a polymer matrix. The composite prepared by this approach has a high inorganic content of 30 wt % or above. However, both of the two approaches involve the dispersion of clay in an organic matrix, and therefore when inorganic content is increased, the material will inevitably become opaque and brittle due to insufficient polymer content.

Accordingly, it is highly desirable to increase inorganic content to improve physical properties while maintaining transparency and flexibility of organic/inorganic hybrid materials.

BRIEF SUMMARY OF THE INVENTION

The invention provides an organic/inorganic hybrid material, comprising an organic polymer; and a plurality of inorganic nanoplatelets, wherein the inorganic nanoplatelets are self-connected or connected via a linker to constitute an inorganic platelet network.

The invention also provides a method for fabricating an organic/inorganic hybrid material, comprising: (a) providing an organic dispersion of inorganic nanoplatelets; and (b) mixing the organic dispersion with a polymer solution to form an organic/inorganic hybrid material, wherein the inorganic nanoplatelets are self-connected or connected via a linker to constitute an inorganic network structure.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a novel route to form an inorganic network matrix in organic/inorganic hybrid materials by interconnection of clays. By the formation of the inorganic network structure, the hybrid materials can keep their transparency and flexibility at a high inorganic content, and exhibit greatly reduced coefficients of thermal expansion.

Figure 1:
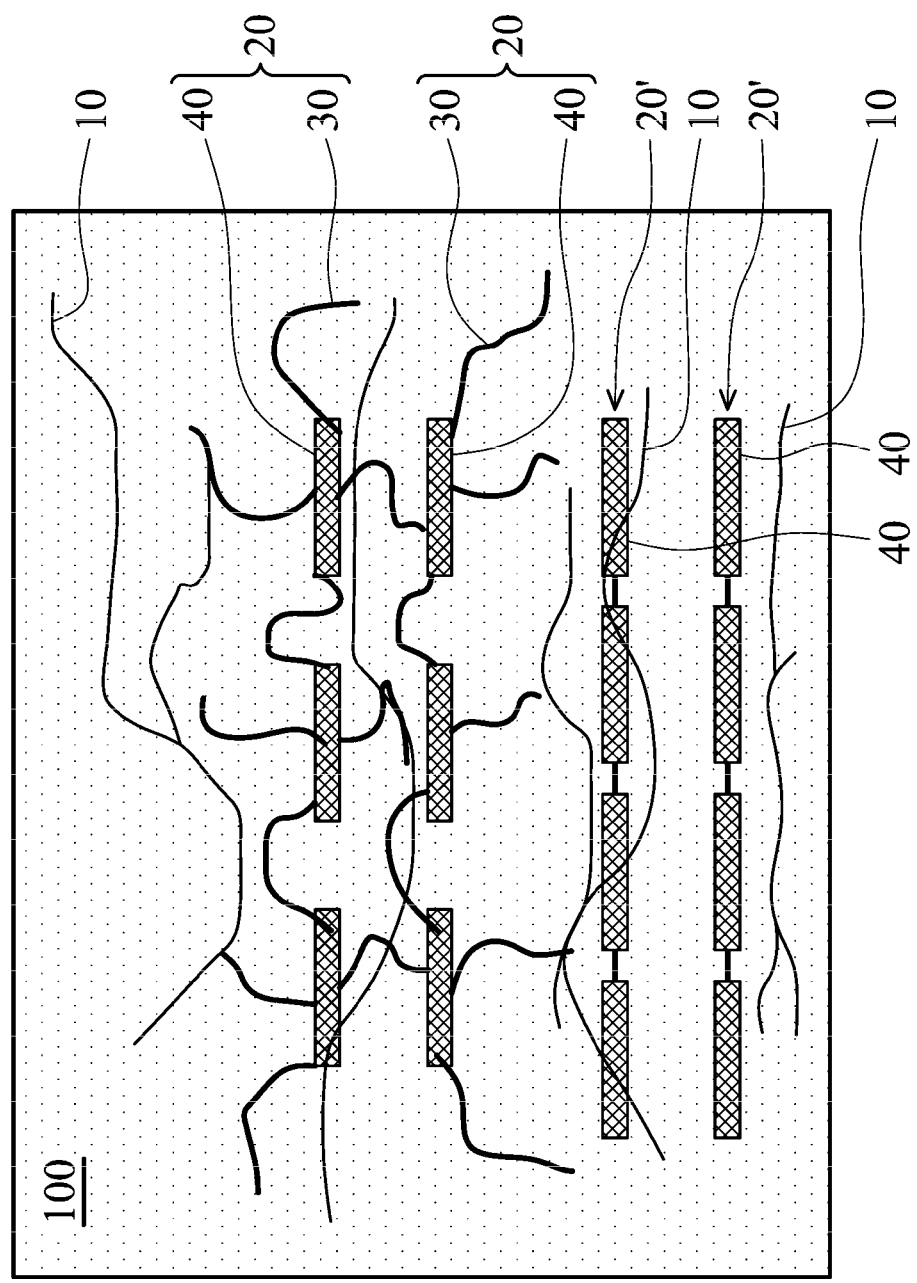
FIG. 1 is a schematic view of organic/inorganic hybrid materials according to an embodiment of the invention.

Referring to FIG. 1, a schematic view of an organic/inorganic hybrid material 100 according to an embodiment of the invention is shown. The organic/inorganic hybrid material 100 includes an organic polymer 10 and an inorganic platelet network structure 20 or 20'. In one embodiment, the inorganic platelet network structure 20 is a continuous phase constituted by a plurality of inorganic nanoplatelets 40 having a size of about 5-500 nm through connection with a linker 30. In another embodiment, the inorganic platelet network structure 20' is a continuous phase formed by self-connection of the inorganic nanoplatelets 40. Thus, the hybrid material of the invention is characterized by the formation of organic-inorganic bicontinuous phases, wherein the organic polymer 10 may or may not be chemically bonded to the inorganic platelet network structure 20/20'. This is distinct from the conventional approaches which modify clays with quaternary ammonium compounds or surface modifiers and then disperse the modified clay in a continuous organic phase.

In conventional hybrid materials, inorganic nanoplatelets are dispersed in a polymer matrix as a discontinuous phase, and when the inorganic content is increased to over 30 wt %, the haze level of the hybrid materials will increase due to light scattering of the inorganic nanoplatelets, resulting in poor transparency. On the other hand, in the hybrid materials of the invention, the inorganic nanoplatelets form a three-dimensional network such that the hybrid materials can keep high transparency even at a considerably high inorganic content (>30 wt %).

The organic/inorganic hybrid material of the invention may be prepared from an organic dispersion of inorganic nanoplatelets and a polymer solution. In one embodiment, the inorganic nanoplatelets are self-connected to form the above described inorganic platelet network structure. In another embodiment, a linker can be used to connect the inorganic nanoplatelets to form the inorganic network structure.

The inorganic nanoplatelets used in the invention may be natural or synthetic nanoclays having a size of about 5-500 nm, preferably about 20-300 nm. The inorganic nanoplatelets preferably have an aspect ratio of not less than 10, more preferably about 50-10000. Either cation-exchange clays or anion-exchange clays may be used. The ion exchange capacity may range, for example, from 50 to 200 meq/100 g. Examples of the inorganic nanoplatelets include, but are not limited to, smectite clay, vermiculite, halloysite, sericite, mica, synthetic mica, layered double hydroxide (LDH), synthetic smectite clay (for example, SWN available from Cope Chemical Co.), or combinations thereof. Examples of the smectite clay include montmorillonite, saponite, beidellite, nontronite, hectorite, stevensite, and so on. These inorganic nanoplatelets may be used singly or as a mixture of two or more. It is preferable that the inorganic nanoplatelets contain hydroxyl groups, either inherently or by surface modification.

According to the method of the invention, the inorganic nanoplatelets are provided in an organic dispersion (organosol) using an organic solvent such as N-methyl-2-pyrrolidone (NMP), N,N-dimethylacetamide (DMAc), N,N-dimethylformamide (DMF), dimethyl sulfoxide (DMSO), γ-butyrolactone (GBL), xylene, toluene, or combinations thereof. The organic dispersion may be readily prepared from a corresponding aqueous dispersion (water sol). For example, the inorganic nanoplatelets are dispersed in water to provide an aqueous dispersion. The aqueous dispersion is allowed to pass through columns filled with cation-exchange resins and anion-exchange resins, respectively. By modulating the ratio of cation/anion-exchange resins, a de-ionized aqueous dispersion can be prepared. Subsequently, an organic solvent and a volatile solvent such as isopropanol can be added to the de-ionized aqueous dispersion to remove the water content by co-distillation, thereby forming an organic dispersion of the inorganic nanoplatelets. The solid content of the organic dispersion is preferably about 1-20 wt %, more preferably about 5-10 wt %.

The organic polymer suitable for use herein is not specifically limited, as long as it is soluble in an organic solvent. Illustrative examples of the organic polymer include, but are not limited to, polyimide (PI), polyurethane (PU), polycarbonate (PC), polyarylate resin (PAR), poly(ether sulfones) (PES), cyclo-olefin copolymer (COC), or combinations thereof. A polymer solution is provided by dissolving the organic polymer in an organic solvent such as N-methyl-2-pyrrolidone (NMP), N,N-dimethylacetamide (DMAc), N,N-dimethylformamide (DMF), dimethyl sulfoxide (DMSO), γ-butyrolactone (GBL), xylene, toluene, or combinations thereof. The organic solvent used in the polymer solution is preferably the same or miscible with the organic solvent used in the organic dispersion. The solid content of the polymer solution is preferably about 1-100 wt %, more preferably about 5-30 wt %.

A linker can be used in the invention to provide linkage between the inorganic nanoplatelets to form the inorganic network structure. The linker used herein is preferably alkoxysilane or metal alkoxide, more preferably amino-containing alkoxysilane or metal alkoxide such as (3-aminopropyl)triethoxysilane and aminoethylaminopropyl-trimethoxysilane. The amino group of the linker can catalyze the reaction between the linker and the inorganic nanoplatelets. The linker can be added in an amount of: about 0.1-50 wt %, preferably about 2-20 wt %, based on the weight of the inorganic nanoplatelets; or about 3-5 wt %, based on the weight of the organic/inorganic hybrid material (including the solvent). However, it should be noted that the inorganic network structure can be formed without adding the linker.

Figure 2A:
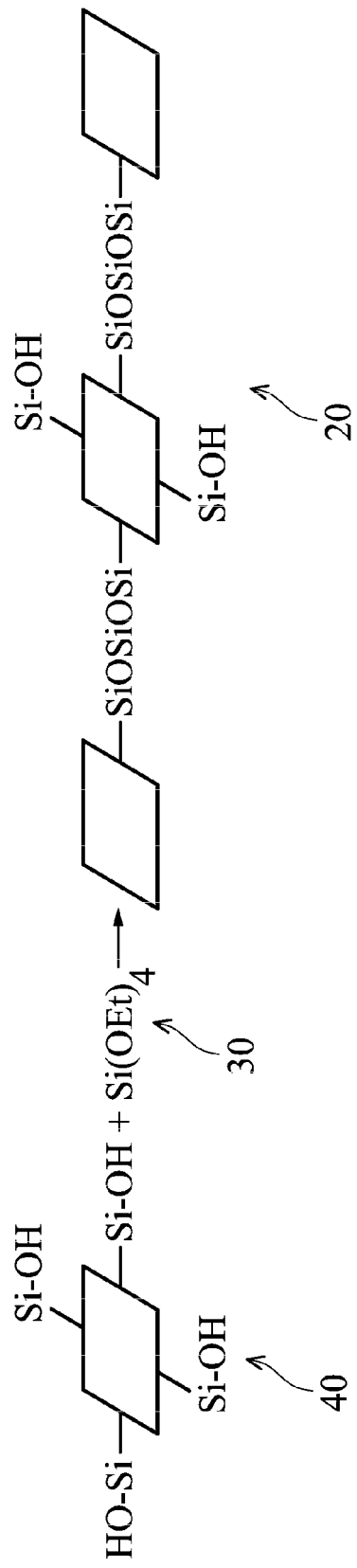
FIGS. 2a-2b show two different mechanisms for the formation of an inorganic platelet network structure.
Figure 2B:
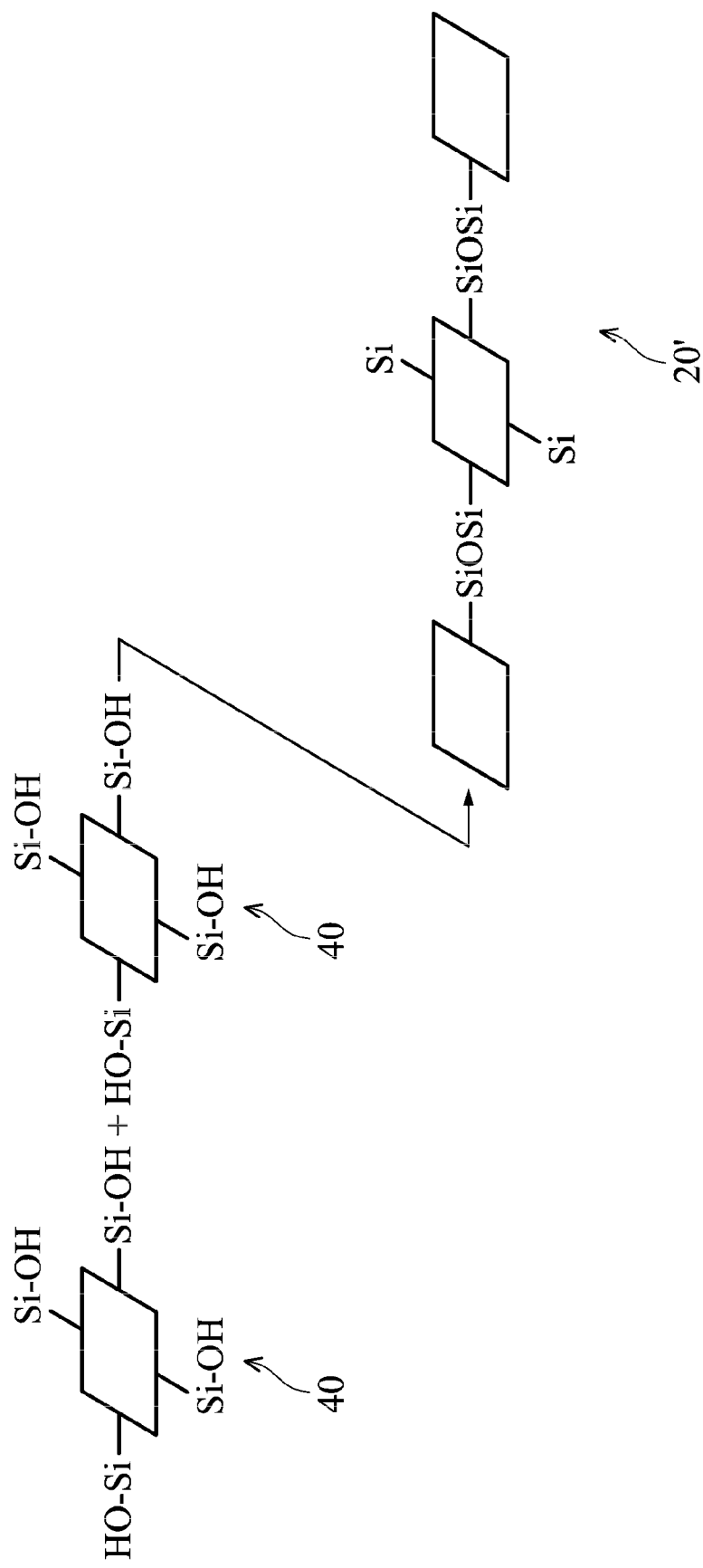

FIG. 2a shows a mechanism for the formation of the inorganic platelet network structure 20 via the aid of a linker 30, taking an alkoxysilane linker as an example. FIG. 2b shows a mechanism for the formation of the inorganic platelet network structure 20' via self-connection of the inorganic nanoplatelets 40.

For self-connection of the inorganic platelets, a diamine, preferably a cycloaliphatic diamine may be used as a catalyst. Examples of suitable cycloaliphatic diamines include as 3-aminomethyl-3,5,5-trimethylcyclohexylamine (IPDA; isophorone diamine), 1,2-diaminocyclohexane, 1,4-bis(aminocyclohexyl)methane, 1,3-bis(aminomethyl)cyclohexane, and bis(aminomethyl)norbornane. Alternatively, a tertiary amine may also be used as a catalyst for the self-connection. The catalyst can be added in an amount of about 0.01-2 wt %, preferably about 0.1-1 wt %, based on the total weight of the organic/inorganic hybrid material (including the solvent therein).

In one embodiment, the organic dispersion of inorganic nanoplatelets, the polymer solution, and the linker (or the catalyst in the case of self-connection) are stirred at room temperature for 0.5-48 hours to complete a reaction. The resulting mixture can be coated on a substrate and dried to obtain the organic/inorganic hybrid material. The coating procedure can be achieved by various coating techniques such as spin coating, blade coating, bar coating, roll coating, screen printing, and so on. The drying procedure is typically carried out at a temperature of 50-210° C. for 1-3 hours, depending on the organic solvent used.

By forming a 3-dimensional inorganic network structure through interconnection of 2-dimensional inorganic nanoplatelets, the inorganic content in the hybrid materials can be drastically increased to improve the properties thereof. In general, the inorganic content can be altered to between 20-50 wt %, and preferably between 30-50 wt % to improve thermal resistance and dimensional stability while keeping high transparency (a transmittance >85%) and flexibility (elongation percentage >2%). The organic/inorganic hybrid materials of the invention can be fabricated into various forms including a film, a plate, a bulk material, or a surface coating.

In the following examples, all percentages are by weight unless otherwise specified. The Comparative Examples 1-9 are subject matters of copending application Ser. No. 12/954,834 filed Nov. 26, 2010 for "Organic/inorganic hybrid material and fabrication method thereof", wherein an inorganic network matrix was formed by interconnection of inorganic particles.

COMPARATIVE EXAMPLE 1

Synthesis of Polyimide Polymer Solution BB
(B1317-BAPPm)

0.0147 mole of 4,4'-bis(aminophenoxy)propane (BAPPm) was added to 32.94 g of an m-cresol stirred solvent in a three-necked bottle under N2 at room temperature. After the BAPPm dissolved, 0.015 mole of bicyclo[2.2.2]oct-7-ene-2,3,5,6-tetracarboxylic dianhydride (B1317) was added to the solution. After the B1317 dissolved, the solution was stirred for 1 hour, and a paste solution of polyamic acid was formed and heated to 220° C. for 3 hours, during which water was distilled from the solution, and a reaction mixture containing polyimide was formed. The mixture was slowly added to methanol in order to precipitate polyimide. The precipitated polyimide was dried in a vacuum oven for 12 hours, and dissolved in DMAc to provide a polyimide polymer solution BB of 20% solid content.

COMPARATIVE EXAMPLE 2

Synthesis of Nano-Silica Dispersion A 100 g of acidic aqueous silica sol-gel (spherical particle, 20 nm in size) having a solid content of 20%, 80 g of isopropanol, and 80 g of DMAc were charged in a 500 ml reactor flask. Water and isopropanol was distilled from the mixture at 25-40° C. under reduced pressure, thus giving a DMAc dispersion A having a solid content of 20%.

COMPARATIVE EXAMPLE 3

Synthesis of Nano-Silica Dispersion B 100 g of acidic aqueous silica sol-gel (chain-shaped particle, 300 nm in size) having a solid content of 20%, 60 g of isopropanol, and 60 g of DMAc were charged in a 500 ml reactor flask. Water and isopropanol was distilled from the mixture at 25-40° C. under reduced pressure, thus giving a DMAc dispersion B having a solid content of 20%.

COMPARATIVE EXAMPLE 4

Synthesis of 20% Nano-Silica (A)/Polyimide (BB) Hybrid Substrate 2 g of DMAc dispersion A and 8 g of polyimide polymer solution BB were charged in a 20 ml sample flask at room temperature. After adding 0.08 g of amino-containing alkoxysilane ("Z6011" from Dow Corning), the mixture was stirred at room temperature for 30 minutes, and then coated on a glass sheet by blade coating. The wet coating was dried in an oven at temperatures of 50° C., 50° C., and 210° C., each for 1 hour. The dried coating was removed from the glass sheet to obtain a 20% silica (A)/polyimide (BB) hybrid substrate.

COMPARATIVE EXAMPLE 5

Synthesis of 30% Nano-Silica (A)/Polyimide (BB) Hybrid Substrate 3 g of DMAc dispersion A and 7 g of polyimide polymer solution BB were charged in a 20 ml sample flask at room temperature. After adding 0.07 g of amino-containing alkoxysilane ("Z6011" from Dow Corning), the mixture was stirred at room temperature for 30 minutes, and then coated on a glass sheet by blade coating. The wet coating was dried in an oven at temperatures of 50° C., 50° C., and 210° C., each for 1 hour. The dried coating was removed from the glass sheet to obtain a 30% silica (A)/polyimide (BB) hybrid substrate.

COMPARATIVE EXAMPLE 6

Synthesis of 40% Nano-Silica (A)/Polyimide (BB) Hybrid Substrate 4 g of DMAc dispersion A and 6 g of polyimide polymer solution BB were charged in a 20 ml sample flask at room temperature. After adding 0.06 g of amino-containing alkoxysilane ("Z6011" from Dow Corning), the mixture was stirred at room temperature for 30 minutes, and then coated on a glass sheet by blade coating. The wet coating was dried in an oven at temperatures of 50° C., 50° C., and 210° C., each for 1 hour. The dried coating was removed from the glass sheet to obtain a 40% silica (A)/polyimide (BB) hybrid substrate.

COMPARATIVE EXAMPLE 7

Synthesis of 20% Nano-Silica (B)/Polyimide (BB) Hybrid Substrate 2 g of DMAc dispersion B and 8 g of polyimide polymer solution BB were charged in a 20 ml sample flask at room temperature. After adding 0.08 g of amino-containing alkoxysilane ("Z6011" from Dow Corning), the mixture was stirred at room temperature for 30 minutes, and then coated on a glass sheet by blade coating. The wet coating was dried in an oven at temperatures of 50° C., 50° C., and 210° C., each for 1 hour. The dried coating was removed from the glass sheet to obtain a 20% silica (B)/polyimide (BB) hybrid substrate.

COMPARATIVE EXAMPLE 8

Synthesis of 30% Nano-Silica (B)/Polyimide (BB) Hybrid Substrate 3 g of DMAc dispersion B and 7 g of polyimide polymer solution BB were charged in a 20 ml sample flask at room temperature. After adding 0.07 g of amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 30% silica (B)/polyimide (BB) hybrid substrate.

COMPARATIVE EXAMPLE 9

Synthesis of 40% Nano-Silica (B)/Polyimide (BB) Hybrid Substrate 4 g of DMAc dispersion B and 6 g of polyimide polymer solution BB were charged in a 20 ml sample flask at room temperature. After adding 0.06 g of amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 40% silica (B)/polyimide (BB) hybrid substrate.

EXAMPLE 1

Synthesis of Nano-Clay Dispersion 25 g of clay (Laponite RDS; disc shape, 25 nm in diameter and 0.92 nm thick) was dispersed in 1000 g of deionized water, and the resulting aqueous dispersion was allowed to pass through columns filled with cation-exchange resin (Dowex Marathon MSC H form) and anion-exchange resin (Dowex Marathon A OH form) respectively, to provide a de-ionized aqueous dispersion, wherein the weight ratio of cation/anion-exchange resins used was 1:1. Next, 1000 g of isopropanol was added to the deionized aqueous dispersion and distilled under vacuum at room temperature to provide a 2.5% isopropanol dispersion. Thereafter, 183 g of γ-butyrolactone was added to the isopropanol dispersion and distilled under vacuum at 30-40° C. to provide a 12% γ-butyrolactone dispersion.

EXAMPLE 2

Synthesis of 20% Nanoclay/Polyimide (BB) Hybrid Substrate 5 g of γ-butyrolactone dispersion (Example 1) and 12 g of polyimide polymer solution BB (Comparative Example 1) were mixed in a reaction flask by stirring, and 1 g DMAc and 0.2 g amino-containing alkoxysilane ("Z6011" from Dow Corning) was later added. The mixture was thoroughly mixed, ultrasonicated for 20 minutes, left standing overnight, and then coated by blade coating. The wet coating was dried in an oven at temperatures of 50° C., 170° C., and 210° C., each for 30 minutes, giving a transparent, 20% nanoclay/polyimide (BB) hybrid substrate.

EXAMPLE 3

Synthesis of 30% Nanoclay/Polyimide (BB) Hybrid Substrate 5 g of γ-butyrolactone dispersion (Example 1) and 7 g of polyimide polymer solution BB (Comparative Example 1) were mixed in a reaction flask by stirring, followed by addition of and 1 g DMAc and 0.15 g amino-containing alkoxysilane ("Z6011" from Dow Corning) was later added. The mixture was thoroughly mixed, ultrasonicated for 20 minutes, left standing overnight, and then coated by blade coating. The wet coating was dried in an oven at an initial temperature of 50° C. for 30 minutes. Then, the oven temperature was raised to 80° C. within 10 minutes, and the coating was dried at temperatures of 80° C., 170° C., and 210° C., each for 30 minutes, giving a transparent, 30% nanoclay/polyimide (BB) hybrid substrate.

EXAMPLE 4

Synthesis of 40% Nanoclay/Polyimide (BB) Hybrid Substrate 5 g of γ-butyrolactone dispersion (Example 1) and 4.5 g of polyimide polymer solution BB (Comparative Example 1) were mixed in a reaction flask by stirring, and 1 g of DMAc and 0.1 g of amino-containing alkoxysilane ("Z6011" from Dow Corning) was later added. The mixture was thoroughly mixed, ultrasonicated for 20 minutes, left standing overnight, and then coated by blade coating. The wet coating was dried in an oven at an initial temperature of 50° C. for 30 minutes. Then, the oven temperature was raised to 80° C. within 10 minutes, and the coating was dried at temperatures of 80° C., 170° C., and 210° C., each for 30 minutes, giving a transparent, 40% nanoclay/polyimide (BB) hybrid substrate.

EXAMPLE 5

Synthesis of 20% Self-Connected Nanoclay/Polyimide (BB) Hybrid Substrate 5 g of γ-butyrolactone dispersion (Example 1) and 12 g of polyimide polymer solution BB (Comparative Example 1) were mixed in a reaction flask by stirring, and 1 g of DMAc and 0.3 g of isophorone diamine (IPDA) as catalyst was later added. The mixture was thoroughly mixed, ultrasonicated for 20 minutes, left standing overnight, and then coated by blade coating. The wet coating was dried in an oven at temperatures of 50° C., 170° C., and 210° C., each for 30 minutes, giving a transparent, 23% (20%?) nanoclay/polyimide (BB) hybrid substrate.

EXAMPLE 6

Synthesis of 30% Self-Connected Nanoclay/Polyimide (BB) Hybrid Substrate 5 g of γ-butyrolactone dispersion (Example 1) and 7 g of polyimide polymer solution BB (Comparative Example 1) were mixed in a reaction flask by stirring, and 1 g of DMAc and 0.2 g of isophorone diamine (IPDA) as catalyst was later added. The mixture was thoroughly mixed, ultrasonicated for 20 minutes, left standing overnight, and then coated by blade coating. The wet coating was dried in an oven at an initial temperature of 50° C. for 30 minutes. Then, the oven temperature was raised to 80° C. within 10 minutes, and the coating was dried at temperatures of 80° C., 170° C., and 210° C., each for 30 minutes, giving a transparent, 30% nanoclay/polyimide (BB) hybrid substrate.

EXAMPLE 7

Synthesis of 40% Self-Connected Nanoclay/Polyimide (BB) Hybrid Substrate 5 g of γ-butyrolactone dispersion (Example 1) and 4.5 g of polyimide polymer solution BB (Comparative Example 1) were mixed in a reaction flask by stirring, and 1 g of DMAc and 0.1 g of isophorone diamine (IPDA) as catalyst was later added. The mixture was thoroughly mixed, ultrasonicated for 20 minutes, left standing overnight, and then coated by blade coating. The wet coating was dried in an oven at an initial temperature of 50° C. for 30 minutes. Then, the oven temperature was raised to 80° C. within 10 minutes, and the coating was dried at temperatures of 80° C., 170° C., and 210° C., each for 30 minutes, giving a transparent, 40% nanoclay/polyimide (BB) hybrid substrate.

TABLE 1

| Inorganic content | Examples 2-4 (Nanoplatelet interconnection) CTE (ppm/° C.) | Examples 5-7 (Nanoplatelet self-connection) CTE (ppm/° C.) | Com. Examples 4-6 (Spherical particle Interconnection) CTE (ppm/° C.) | Com. Examples 7-9 (Chain-shaped particle Interconnection) CTE (ppm/° C.) |
|---|---|---|---|---|
| 0 | 75.4 | 75.4 | 75.4 | 75.4 |
| 20% | 40.3 | 43.5 | 60.6 | 62.6 |
| 30% | 34.8 | 38.7 | 56.6 | 49.8 |
| 40% | 27.6 | 31.6 | 52.3 | 44.5 |

Table 1 summarizes the coefficients of thermal expansion (CTEs) of the hybrid materials having inorganic networks using interconnected nanoplatelets (Examples 2-4), self-connected nanoplatelets (Examples 5-7), spherical particles (Comparative Examples 4-6), and chain-shaped particles (Comparative Examples 7-9). As can be seen from Table 1, the hybrid material having the inorganic platelet network had a much lower CTE in planar (X-Y) directions compared to the counterpart having the inorganic network using interconnected spherical particles or chain-shaped particles. Furthermore, the hybrid materials of Examples 2-7 all exhibited a transmittance of above 85%, an elongation percentage of above 3%, and a CIE b value of below 1.5. The inorganic platelet network of Examples 2 and 4 was confirmed by SEM (scanning electron microscope) pictures (not shown).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An organic/inorganic hybrid material, comprising
   an organic polymer; and
   a plurality of inorganic nanoplatelets, wherein the inorganic nanoplatelets are self-connected or connected to each other via a linker to constitute an inorganic platelet network, wherein the inorganic nanoplatelets are self-connected by siloxane covalent bonds or directly covalently bonded to the linker by siloxane covalent bonds.

2. The organic/inorganic hybrid material as claimed in claim 1, wherein the organic polymer comprises polyimide (PI), polyurethane (PU), polycarbonate (PC), polyarylate resin (PAR), poly(ether sulfones) (PES), cyclo-olefin copolymer (COC), or combinations thereof.

3. The organic/inorganic hybrid material as claimed in claim 1, wherein the inorganic nanoplatelets have a size of about 5-500nm.

4. The organic/inorganic hybrid material as claimed in claim 1, wherein the inorganic nanoplatelets comprise smectite clay, vermiculite, halloysite, sericite, mica, synthetic mica, layered double hydroxide (LDH), synthetic smectite clay, or combinations thereof.

5. The organic/inorganic hybrid material as claimed in claim 4, wherein smectite clay comprises montmorillonite, saponite, beidellite, nontronite, hectorite, stevensite, or combinations thereof 6. The organic/inorganic hybrid material as claimed in claim 1, wherein the linker comprises alkoxysilane.

7. The organic/inorganic hybrid material as claimed in claim 6, wherein the linker is amino-containing alkoxysilane.

8. The organic/inorganic hybrid material as claimed in claim 1, wherein the inorganic nanoplatelets are present in an amount of 20-50% by weight, based on the weight of the organic/inorganic hybrid material.

9. The organic/inorganic hybrid material as claimed in claim 1, wherein the organic/inorganic hybrid material has a transmittance of above 85%.

10. The organic/inorganic hybrid material as claimed in claim 1, wherein the linker is present in an amount of about 3-5% by weight, based on the weight of the organic/inorganic hybrid material.

11. A method for fabricating the organic/inorganic hybrid material as set forth in claim 1, comprising
   (a) providing an organic dispersion of inorganic nanoplatelets; and
   (b) mixing the organic dispersion with a polymer solution to form an organic/inorganic hybrid material, wherein the inorganic nanoplatelets are self-connected or connected to each other via a linker to constitute an inorganic network structure, wherein the inorganic nanoplatelets are self-connected by siloxane covalent bonds or directly covalently bonded to the linker by siloxane covalent bonds.

12. The method as claimed in claim 11, wherein step (a) comprises:
   dispersing inorganic nanoplatelets in water to provide an aqueous dispersion of the inorganic nanoparticles;
   treating the aqueous dispersion with cation and anion exchange resins to provide a de-ionized aqueous dispersion;
   adding an organic solvent and a volatile solvent to the de-ionized aqueous dispersion to proceed with co-distillation to provide the organic dispersion of the inorganic nanoplatelets.

13. The method as claimed in claim 11, wherein step (b) is carried out at room temperature for 0.5-48 hours.

14. The method as claimed in claim 11, wherein each of the organic dispersion and the polymer solution, independently, comprises an organic solvent comprising N-methyl-2-pyrrolidone (NMP), N,N-dimethylacetamide (DMAc), N,N-dimethylformamide (DMF), dimethyl sulfoxide (DMSO), γ-butyrolactone (GBL), xylene, toluene, or combinations thereof.

15. The method as claimed in claim 11, wherein the inorganic nanoplatelets are present in an amount of about 20-50% by weight, based on the weight of the organic/inorganic hybrid material.

16. The method as claimed in claim 11, wherein the linker is present in an amount of about 3-5% by weight, based on the weight of the organic/inorganic hybrid material.

17. The method as claimed in claim 11, wherein step (b) further comprises adding a catalyst for catalyzing self-connection of the inorganic nanoplatelets.

18. The method as claimed in claim 17, wherein the catalyst comprises diamine, or tertiary amine.

19. The method as claimed in claim 18, wherein the diamine comprises cycloaliphatic diamine.

20. The method as claimed in claim 17, wherein the catalyst is present in an amount of about 0.01-2% by weight, based on the weight of the organic/inorganic hybrid material.

* * * * *